(12) United States Patent
Ehara (10) Patent No.: US 7,373,298 B2
(45) Date of Patent: May 13, 2008

(54) APPARATUS AND METHOD FOR CODING EXCITATION SIGNAL

(75) Inventor: Hiroyuki Ehara, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 408 days.

(21) Appl. No.: 10/923,694

(22) Filed: Aug. 24, 2004

(65) Prior Publication Data

US 2005/0058208 A1     Mar. 17, 2005

(30) Foreign Application Priority Data

Sep. 17, 2003   (JP)   ............................. 2003-325002

(51) Int. Cl.
*G10L 15/20*   (2006.01)
(52) U.S. Cl. ...................... 704/233; 704/220; 704/219; 704/223
(58) Field of Classification Search ................ 704/220, 704/211, 216, 219, 223, 224, 225; 375/316, 375/349; 703/233
See application file for complete search history.

(56) References Cited

U.S. PATENT DOCUMENTS 5,933,457 A * 8/1999 Hottinen ..................... 375/316
6,104,992 A * 8/2000 Gao et al. ................... 704/220
6,141,638 A * 10/2000 Peng et al. .................. 704/211

FOREIGN PATENT DOCUMENTS

| JP | 05073097 | 3/1993 |
|----|----------|--------|
| JP | 2700974  | 10/1997 |
| JP | 2002084194 | 3/2002 |

OTHER PUBLICATIONS

K. Mano, et al.; "Design of a Pitch Synchronous Innovation CELP Coder for Mobile Communications," IEEE Journal on Selected Areas in Communications, vol. 13, No. 1, Jan. 1995, pg. 31-41.
C. Montminy, et al.; "Improving the Performance of ITU-T G.729A for VoIP," IEEE IMCE2000, pg. 433-436.

* cited by examiner

*Primary Examiner*—Huyen X. Vo
(74) *Attorney, Agent, or Firm*—Dickinson Wright, PLLC (57) ABSTRACT

An excitation signal coding apparatus capable of improving an error resilience by changing an excitation vector search method (more specifically, an error minimization criterion during a search). This coding apparatus is allowed to choose either of an ordinary search method and the search method of the present invention with using information input from a transmission channel condition monitoring section (215). That is, an ordinary search method is used when the transmission channel condition is good and no packet discarding is observed on the receiving side, and the search method of the present invention is used otherwise (when packet discarding is observed on the receiving side at a discarding rate of 5% or more, for example).

7 Claims, 7 Drawing Sheets

APPARATUS AND METHOD FOR CODING EXCITATION SIGNAL

BACKGROUND OF THE INVENTION

1. Field of the Invention

The present invention relates to an excitation signal coding apparatus and an excitation signal coding method.

2. Description of the Related Art

Conventionally, a CELP (code excitation linear prediction) speech coding scheme generally uses, as an excitation coding means, a configuration provided with two types of excitation codebooks; a codebook whose contents are adaptively changed based on past output and a codebook with predetermined fixed contents, excitation signals being coded with the sum of vectors output from these two types of codebooks.

More specifically, it is a general practice that an adaptive codebook which is a buffer of coding excitation vectors generated in the past is used as the codebook of the former and an algebraic codebook, noise codebook or random codebook, etc., is used as the codebook of the latter. Here, the codebook of the former will be referred to as an "adaptive codebook" and the codebook of the latter will be referred to as a "fixed codebook."

Figure 1:
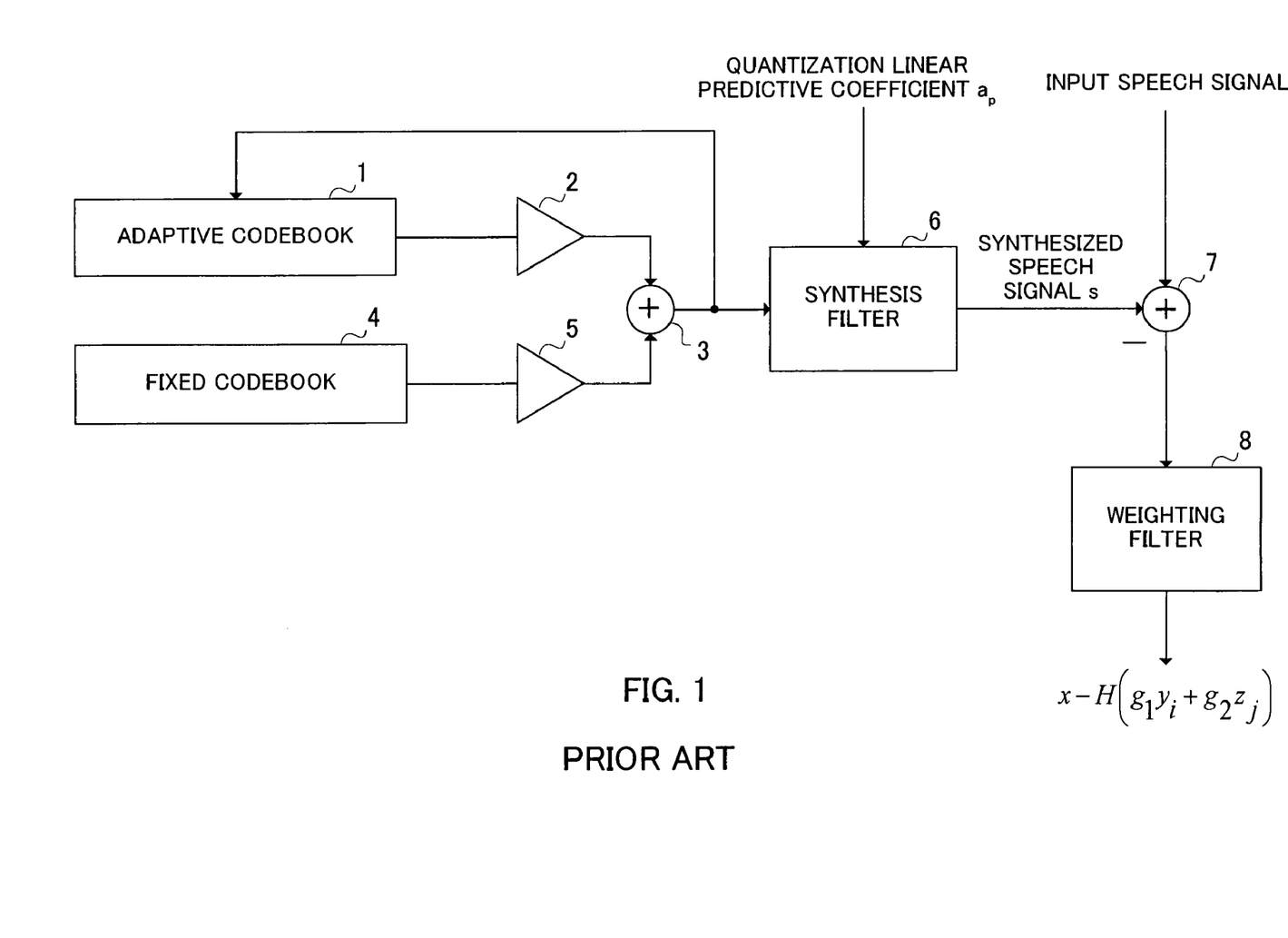
FIG. 1 is a block diagram showing a conventional CELP coding model.

FIG. 1 illustrates a general CELP coding model. A first excitation vector $y_i$ is output from an adaptive codebook 1, multiplied by $g_1$ by a multiplier 2 and input to an adder 3. A second excitation vector $z_j$ is output from a fixed codebook 4, multiplied by $g_2$ by a multiplier 5 and input to the adder 3. The adder 3 adds up the first excitation vector $y_i$ multiplied by $g_1$ and the second excitation vector $z_j$ multiplied by $g_2$, outputs the addition result to a synthesis filter 6 and the adaptive codebook 1 simultaneously.

The excitation vector $(g_1 y_i + g_2 z_j)$ output to the adaptive codebook 1 is used to update the adaptive codebook 1. The synthesis filter 6 uses a separately input quantized quantization linear predictive coefficient $a_p$ and the excitation vector input from the adder 3 to combine a synthesized speech signal s according to the following Expression (1). In Expression (1), L denotes a vector length (subframe length)

$$s(n) = \sum_{p=1}^{P} a_p s(n-p) + (g_1 y_i(n) + g_2 z_j(n)), \quad (1)$$

$$n = 0, 1, 2, \cdots, L-1$$

The synthesized speech signal s output from the synthesis filter 6 is input to an adder 7. The adder 7 calculates an error between the synthesized speech signal s and the input speech signal and outputs the error to a weighting filter 8. The weighting filter 8 carries out perceptual weighting on the error signal input from the adder 7 and outputs the weighted signal. Here, for the second excitation vector output from the fixed codebook 4, pitch synchronization processing is generally carried out when a pitch period is shorter than the vector length, and such processing is processing expressed, for example, by $z_j(n) = z_j(n) + \beta \times z_j(n-T)$ ($\beta$ denotes a period gain factor, T denotes a pitch period), but this processing is omitted here.

Figure 2:
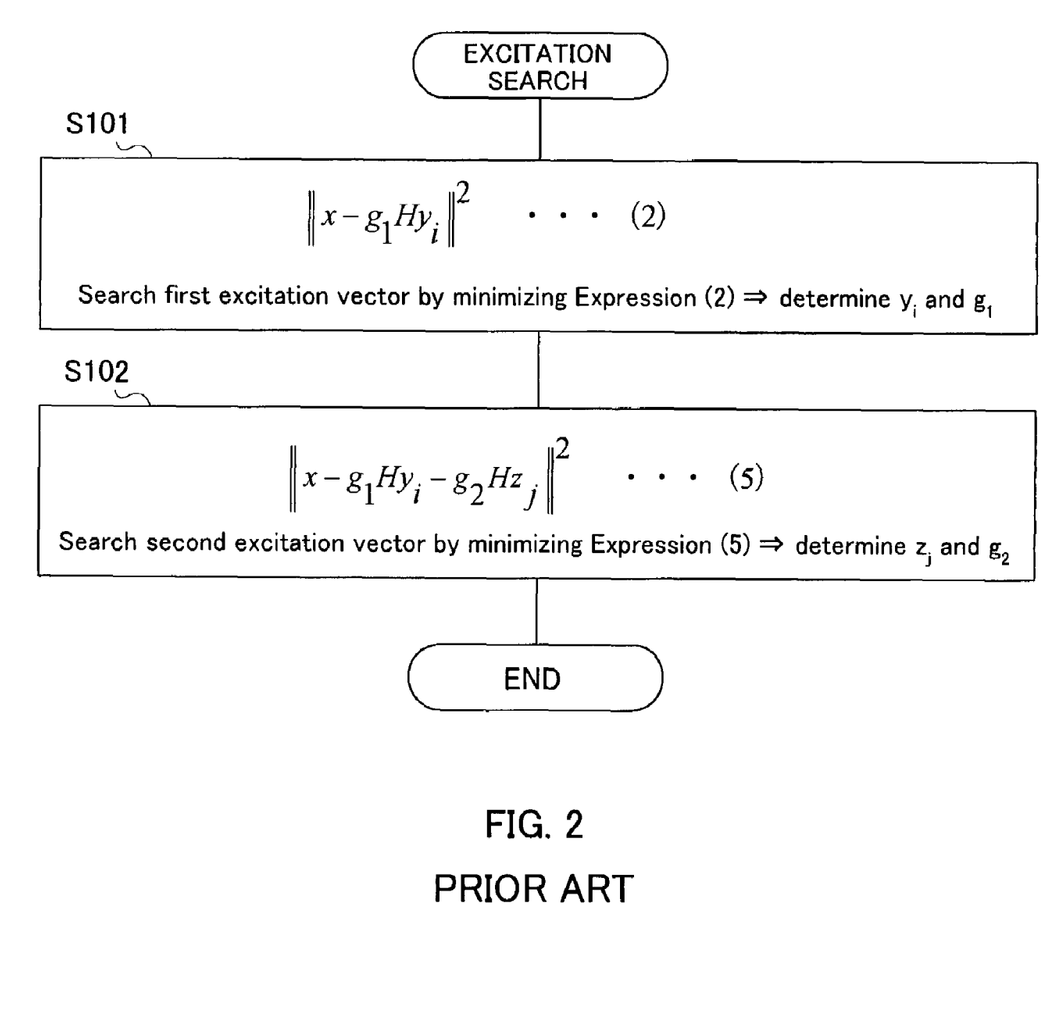
FIG. 2 is a flow chart showing a conventional excitation codebook search method.

Next, it is an excitation search that determines a first excitation vector $y_i$, second excitation vector $z_j$, first excitation vector gain $g_1$ and second excitation vector gain $g_2$ so as to minimize the perceptual weighted error signal output from the weighting filter 8 and more specifically the excitation search is carried out in the processing flow shown in FIG. 2.

First, in step S101, an adaptive codebook search (selection of a first excitation vector) is performed. This adaptive codebook search is performed so as to minimize the perceptual weighted error signal without using the fixed codebook. A more specific expression is Expression (2) shown in step S101 in FIG. 2 and the first excitation vector $y_i$ and first excitation vector gain $g_1$ which minimize this value are determined. In Expression (2), x denotes a target vector, $g_1$ denotes a first excitation vector gain, H denotes a filter impulse response convolutional matrix and $y_i$ denotes a first excitation vector.

More specifically, the first excitation vector $y_i$ is determined by maximizing Expression (3) shown below and the first excitation vector gain $g_1$ at this time is expressed by Expression (4) shown below. In Expressions (3), (4), $Y_i$ denotes a perceptual weighted synthesized speech signal obtained by convoluting an impulse response h of a filter which is a cascaded filter of the synthesis filter 6 and weighting filter 8 into the first excitation vector $y_i$ and x is a target vector (vector which becomes a target for a signal combined from excitation vectors, and when the vector combined from the excitation vectors matches this vector, this means that the input speech signal matches the synthesized speech signal) obtained by subtracting the signal resulting from a zero-input response of the synthesis filter 6 passed through the weighting filter 8 from the output signal (perceptual weighting speech signal) when an input speech signal is input to the weighting filter 8. The first excitation vector gain $g_1$ may be quantized or coded here or may also be quantized or coded through simultaneous optimization of the first excitation vector gain $g_1$ and second excitation vector gain $g_2$ after a fixed codebook search is completed in next step S102. The way of quantization/coding is not particularly limited here.

$$\frac{\left(\sum_{n=0}^{L-1} x(n) Y_i(n)\right)^2}{\sum_{n=0}^{L-1} Y_i(n) Y_i(n)} \quad (3)$$

$$\frac{\sum_{n=0}^{L-1} x(n) Y_i(n)}{\sum_{n=0}^{L-1} Y_i(n) Y_i(n)} \quad (4)$$

Next, in step S102, a fixed codebook search (selection of second excitation vector $z_j$) is performed. Here, in combination with the already determined first excitation vector $y_i$, a second excitation vector $z_j$ and second excitation vector gain $g_2$ are determined so as to minimize the error relative to the target vector x. A specific expression is Expression (5) shown in step S102 in FIG. 2 and $z_j$ and $g_2$ are determined so as to minimize this value. In Expression (5), $g_2$ denotes a second excitation vector gain and $z_j$ denotes a second excitation vector.

Minimizing Expression (2) determines the first excitation vector $y_i$ and the first excitation vector gain $g_1$, and therefore a cross-correlation between the target vector x and second excitation vector $z_j$ normally diminishes. Such tendency is noticeable in the case of a periodic signal in particular.

As shown in FIG. 1, since the adaptive codebook for generating the first excitation vector $y_i$ is the buffer of the excitation vectors generated in the past, when the contents of the adaptive codebook as the buffer differ from the original contents due to transmission errors or frame loss, etc., the adaptive codebook cannot generate correct first excitation vector $y_i$ even if correct excitation coding information is received. On the other hand, the second excitation vector $z_j$ is generated correctly if a correct code is received, but when a periodic signal is coded as described above, the coding (codebook search) is performed so that there is no strong correlation between the second excitation vector $z_i$ and target vector x, and therefore it is not possible to generate a signal close to the target vector x, which causes the influence of an error to be propagated for a long time.

To solve this problem, an adaptive codebook in a different configuration which is less affected by errors is conventionally proposed.

For example, the Unexamined Japanese Patent Publication No. HEI 5-73097 adopts a configuration which generates a first excitation vector by adding up vectors extracted from a plurality of past points in time. Even if part of the buffer does not constitute a correct signal due to influences of transmission path errors, using vectors extracted from a plurality of past points in time can reduce the influences of errors with the presence of the vectors extracted from different points in time free of the influences of errors.

Furthermore, the Japanese Patent Publication No. 2700974 and K. Mano et al, "Design of a pitch synchronous innovation CELP coder for mobile communications," (IEEE Journal on Selected Areas in Communications, vol. 13, issue 1, January 1995 pp. 31-41) adopt a configuration of switching between adaptive codebook and fixed codebook (used here instead of an adaptive codebook, but different in meaning from the fixed codebook used in the present application) and achieving the effect of resetting the adaptive codebook, which can suppress erroneous propagation compared to a case where no switching is performed.

Furthermore, for example, C. Montminy and T. Abulasr: "Improving the performance of ITU-T G.729A for VoIP" (proc. IEEE ICME2000, pp. 433-436 (2000)) also studies the feasibility of suppressing erroneous propagation by periodically resetting the contents of an adaptive codebook without changing any coding algorithm.

However, changing the configuration of the adaptive codebook itself as described above may cause an amount of memory, amount of calculation or the scale of a program, etc., to increase. Furthermore, when a specific algorithm defined by standards, etc., needs to be used, it is not possible to change the configuration of the adaptive codebook itself to improve the error characteristic as described above. Though the technique described in Non-Patent Document 2 has no such problems, but has considerable deterioration of quality after reset and fails to achieve effects in frames which are not reset.

SUMMARY OF THE INVENTION

It is an object of the present invention to provide an excitation signal coding apparatus and excitation signal coding method capable of improving error characteristics by changing the above described conventional excitation vector search method (more specifically, error minimization reference (criteria) during a search).

In order to attain the above described object, the present invention uses an evaluation measure (error criteria) such that an error vector between a synthesized speech signal component generated by an adaptive codebook and an input speech signal approximates to a vector having similarity to the input signal to carry out an adaptive codebook search and increase a correlation between a synthesized speech signal component generated by the fixed codebook and the input speech signal. In this way, the present invention improves an SN ratio between the synthesized speech signal generated by the fixed codebook and input speech signal, and can thereby generate a signal with a waveform similar to the combined signal to be originally decoded according to the fixed codebook even if the adaptive codebook does not function correctly due to channel errors, etc.

An aspect of the invention is an excitation signal coding apparatus that codes an excitation signal using the sum of a first excitation vector output from a first excitation codebook and a second excitation vector output from a second excitation codebook, comprising a first excitation codebook search section that minimizes an error between a residual vector subtracting a first synthesized vector, generated using the first excitation vector, from a first target vector and a second target vector similar to the first target vector and a second excitation codebook search section that minimizes the error between the residual vector and a second synthesized vector generated using the second excitation vector.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENT

With reference now to the attached drawings, an embodiment of the present invention will be explained in detail below.

Figure 3:
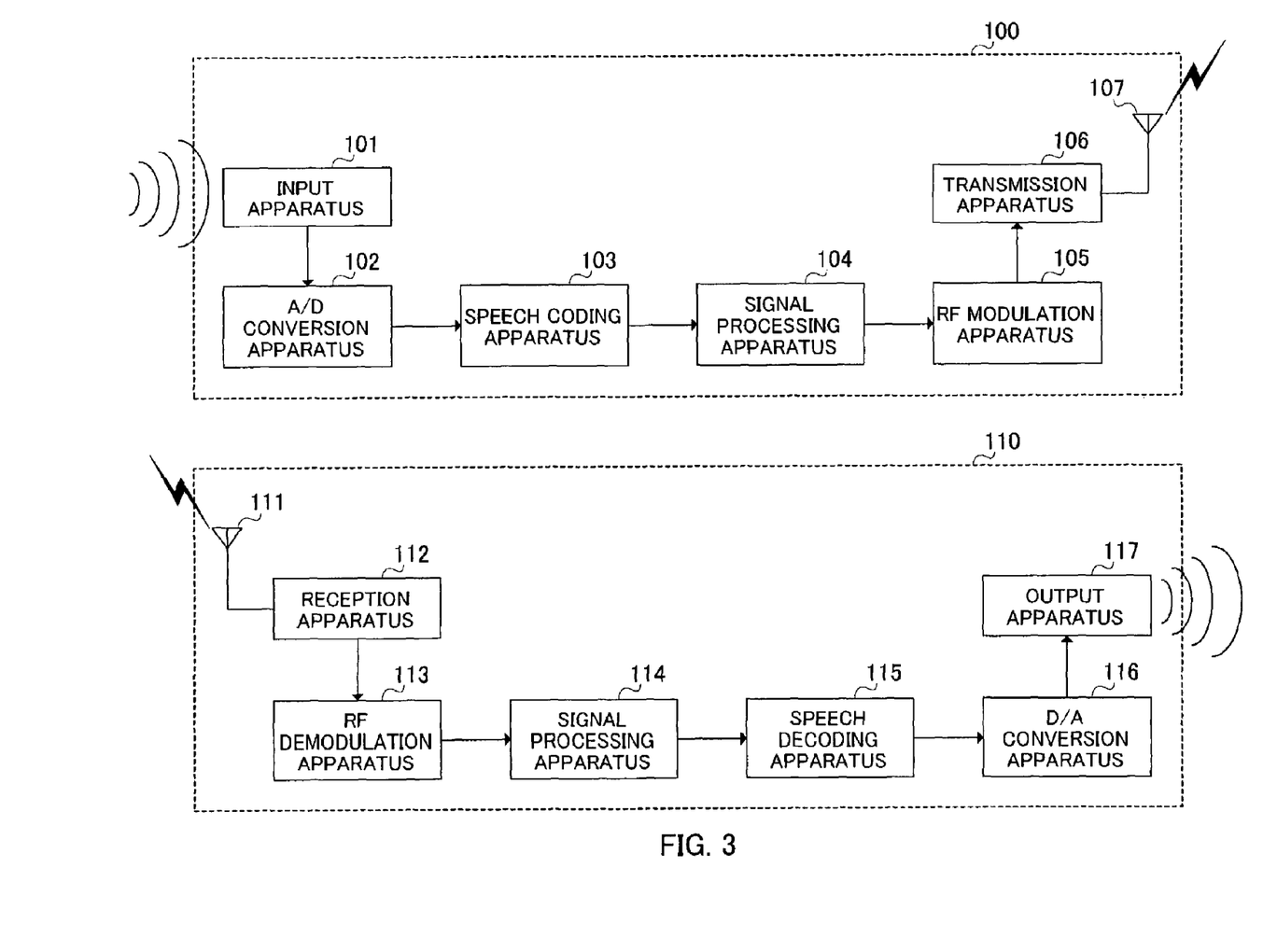
FIG. 3 is a block diagram showing configurations of a base station and a mobile station apparatus in a speech signal transmission system according to an embodiment to which the present invention is applied.

FIG. 3 is a block diagram showing a configuration of a speech signal transmission system according to an embodiment of the present invention.

In FIG. 3, the speech signal transmission system comprises a base station 100 provided with the function as an excitation signal coding apparatus of the present invention and a mobile station apparatus 110.

The base station 100 comprises an input apparatus 101, an A/D conversion apparatus 102, a speech coding apparatus 103, a signal processing apparatus 104, an RF modulation apparatus 105, a transmission apparatus 106 and an antenna 107.

An input terminal of the A/D conversion apparatus 102 is connected to the input apparatus 101. An input terminal of the speech coding apparatus 103 is connected to an output terminal of the A/D conversion apparatus 102. An input terminal of the signal processing apparatus 104 is connected to an output terminal of the speech coding apparatus 103. An input terminal of the RF modulation apparatus 105 is connected to an output terminal of the signal processing apparatus 104. An input terminal of the transmission apparatus 106 is connected to an output terminal of RF modulation apparatus 105. The antenna 107 is connected to an output terminal of the transmission apparatus 106.

The input apparatus 101 is made up of a microphone, etc., receives the user's speech, converts this speech to an analog speech signal which is an electric signal and outputs the analog speech signal to the A/D conversion apparatus 102. The A/D conversion apparatus 102 converts the analog speech signal input from the input apparatus 101 to a digital speech signal and outputs the digital speech signal to the speech coding apparatus 103.

The speech coding apparatus 103 codes the digital speech signal input from the A/D conversion apparatus 102, generates a speech coded bit stream and outputs the speech coded bit stream to the signal processing apparatus 104. The signal processing apparatus 104 carries out channel coding processing, packetizing processing and transmission buffering processing, etc., on the speech coded bit stream input from the speech coding apparatus 103, and then outputs the speech coded bit stream to the RF modulation apparatus 105.

The RF modulation apparatus 105 modulates the signal of the speech coded bit stream subjected to the channel coding processing, etc., input from the signal processing apparatus 104 and outputs the modulated signal to the transmission apparatus 106. The transmission apparatus 106 sends the modulated speech coded signal input from the RF modulation apparatus 105 to the mobile station apparatus 110 as a radio wave (RF signal) through the antenna 107.

The base station 100 carries out processing on the digital speech signal obtained through the A/D conversion apparatus 102 in units of a frame of several tens of ms. When the network constituting the system is a packet network, coded data of one frame or several frames is put into one packet and this packet is sent to a packet network. When the network is a circuit switched network, no packetizing processing or transmission buffering processing is required.

The mobile station apparatus 110 is provided with an antenna 111, a reception apparatus 112, an RF demodulation apparatus 113, a signal processing apparatus 114, a speech decoding apparatus 115, a D/A conversion apparatus 116 and an output apparatus 117.

An input terminal of the reception apparatus 112 is connected to the antenna 111. An input terminal of the RF demodulation apparatus 113 is connected to an output terminal of the reception apparatus 112. An input terminal of the signal processing apparatus 114 is connected to an output terminal of the RF demodulation apparatus 113. An input terminal of the speech decoding apparatus 115 is connected to an output terminal of the signal processing apparatus 114. An input terminal of the D/A conversion apparatus 116 is connected to an output terminal of the speech decoding apparatus 115. An input terminal of the output apparatus 117 is connected to an output terminal of the D/A conversion apparatus 116.

The reception apparatus 112 receives a radio wave (RF signal) including speech coding information sent from the base station 100 through the antenna 111, generates a received speech coded signal which is an analog electric signal and outputs this signal to the RF demodulation apparatus 113. If the radio wave (RF signal) received through the antenna 111 has no signal attenuation or channel noise, the radio wave becomes completely the same as the radio wave (RF signal) sent from the base station 100.

The RF demodulation apparatus 113 demodulates the received speech coded signal input from the reception apparatus 112 and outputs the demodulated signal to the signal processing apparatus 114. The signal processing apparatus 114 carries out jitter absorption buffering processing, packet assembly processing and channel decoding processing, etc., on the received speech coded signal input from the RF demodulation apparatus 113 and outputs the received speech coded bit stream to the speech decoding apparatus 115.

The speech decoding apparatus 115 carries out decoding processing on the received speech coded bit stream input from the signal processing apparatus 114, generates a decoded speech signal and outputs the decoded speech signal to the D/A conversion apparatus 116. The D/A conversion apparatus 116 converts the digital decoded speech signal input from the speech decoding apparatus 115 to an analog decoded speech signal and outputs the analog decoded speech signal to the output apparatus 117. The output apparatus 117 is constructed of a speaker, etc., and converts the analog decoded speech signal input from the D/A conversion apparatus 116 to air vibration and outputs the air vibration as sound wave audible to the human ear.

Next, the processing procedure of the excitation vector search method applied at the speech coding apparatus 103 will be explained with reference to the flow chart shown in FIG. 4. The flow chart in this FIG. 4 differs from the flow chart in FIG. 2 in that the expression of the minimization reference in step S201 is Expression (6).

In Expression (6), H denotes a perceptual weighted synthesis filter impulse response convolution matrix, which is expressed by the following expression assuming that the impulse response vector is $h=\{h_0, h_1, \ldots h_{L-1}\}$:

$$H = \begin{bmatrix} h_0 & & & & \\ h_1 & h_0 & & 0 & \\ h_2 & h_1 & h_0 & & \\ \vdots & \ddots & \ddots & \ddots & \\ h_{L-1} & \cdots & h_2 & h_1 & h_0 \end{bmatrix} \quad (7)$$

Furthermore, a weighting matrix W is expressed by following Expression (8):

$$W = \begin{bmatrix} w_0 & & & & \\ & w_1 & & 0 & \\ & & w_2 & & \\ & 0 & & \ddots & \\ & & & & w_{L-1} \end{bmatrix}, 0.0 \leq w_i \leq 1.0 \quad (8)$$

In Expression (8), if $w_0=w_1=\ldots=w_{L-1}=k$ is assumed, Wx is simply the amplitude of an input signal x multiplied by a scalar value (k). W is designed so as to obtain a desirable waveform generated from the fixed codebook. To obtain a shape completely the same as the shape of the input signal, the amplitude needs only to be multiplied by a scalar value with all weighting factors set to the same value as described above, and when particular input signals of a larger amplitude should be generated according to the fixed codebook, it is possible to use weighting factors, for example, $w_i=|x_i|/\min(|x_i|)$, $w_i=(x_i^2)^{1/2}/\min((x_i^2)^{1/2})$, $w_i=x_i^2/\min(x_i^2)$.

Excitation codebook search is performed once per a unit time block (here, subframe having a time length L), and when one frame consists of n subframes, excitation search is performed n times per frame. Excitation codebook search in FIG. 4 may be performed for each subframe or the excitation codebook search method in FIG. 4 may be used only in the first subframe of each frame.

The search method for the fixed codebook in step S202 is the same as that in step S102 in FIG. 2, and therefore explanations thereof will be omitted. Furthermore, the configuration and operation of the coding model are the same as those in FIG. 1, and therefore explanations thereof will be omitted.

Figure 5:
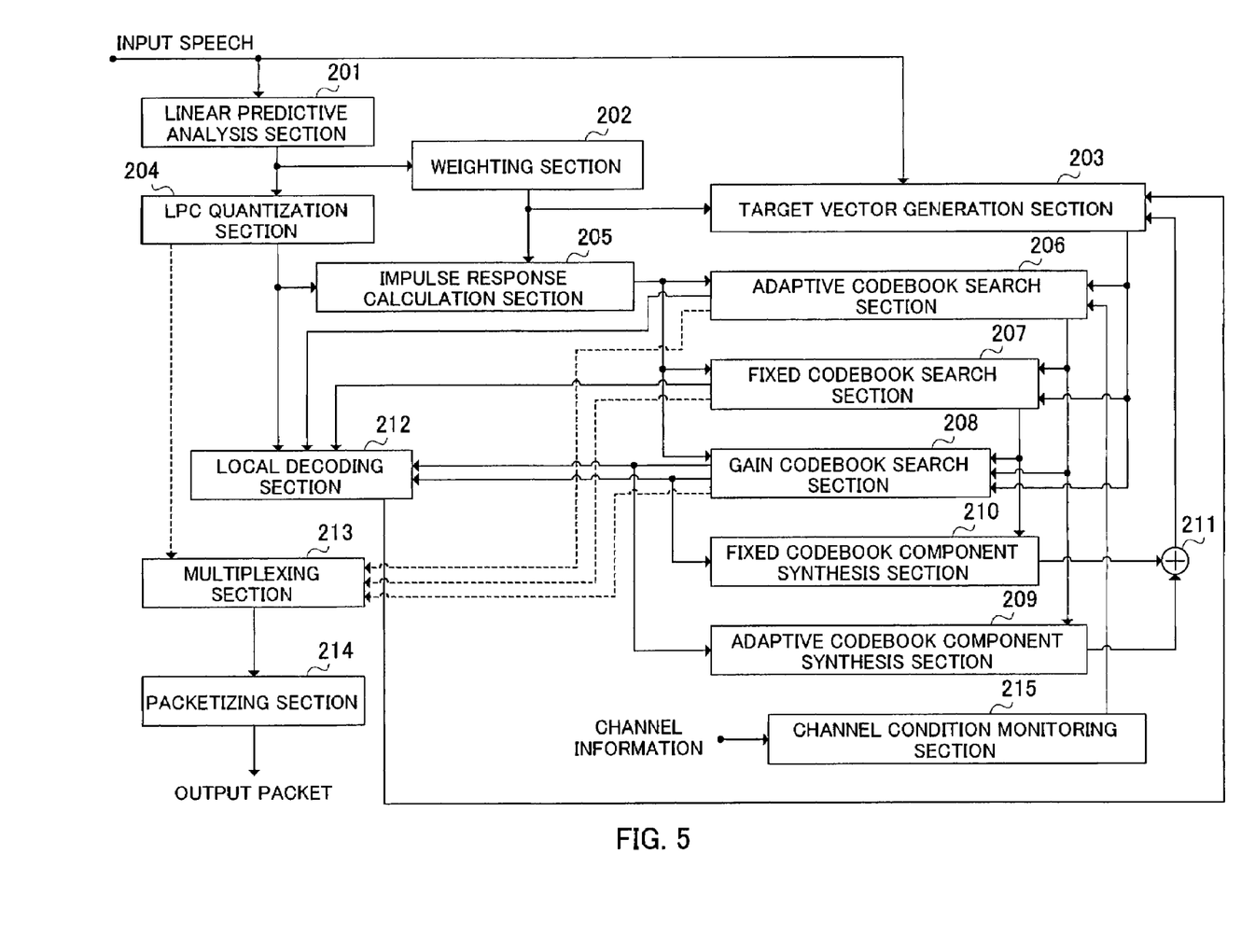
FIG. 5 is a block diagram of a speech coding apparatus used for a speech signal transmission system according to this embodiment.

FIG. 5 is a block diagram showing an internal configuration of the speech coding apparatus 103 in FIG. 3. In FIG. 5, reference numeral 201 denotes a linear predictive analysis section that carries out a linear predictive analysis on an input speech signal, 202 denotes a weighting section that carries out perceptual weighting, 203 denotes a target vector generation section that generates a target signal synthesized according to a CELP model, 204 denotes an LPC quantization section that quantizes a set of linear predictive coefficients, 205 denotes an impulse response calculation section that calculates an impulse response of a cascaded filter of a synthesis filter made up of a set of quantized linear predictive coefficients and a filter which carries out perceptual weighting, 206 denotes an adaptive codebook search section, 207 denotes a fixed codebook search section, 208 denotes a gain codebook search section, 209 denotes an adaptive codebook component synthesis section that calculates a signal generated from only the adaptive codebook, 210 denotes a fixed codebook component synthesis section generated from only the fixed codebook, 211 denotes an adder that adds up the adaptive codebook component and the fixed codebook component, 212 denotes a local decoding section that generates a decoded speech signal using quantization parameters, 213 denotes a multiplexing section that multiplexes coding parameters, 214 denotes a packetizing section that packetizes a coded bit stream, and 215 denotes a channel condition monitoring section that monitors the transmission condition of the channel used and outputs a control signal for changing an adaptive codebook search method when packets are frequently discarded in the transmission channel (or changing the contents of the weighting matrix W).

An input speech signal to be coded is input to the linear predictive analysis section 201 and the target vector generation section 203. The linear predictive analysis section 201 carries out a linear predictive analysis and outputs a set of linear predictive coefficients (LPC) to the weighting section 202 and the LPC quantization section 204.

The weighting section 202 calculates a perceptual weighting filter coefficients and outputs the perceptual weighting filter coefficients to the target vector generation section 203 and the impulse response calculation section 205. The perceptual weighting filter is expressed by a transfer function shown in Expression (9) below. In this Expression (9), P denotes the order of linear predictive analysis, $a_i$ denotes the $i$th linear predictive coefficient. $\gamma_1$ and $\gamma_2$ denote weighting factors, which may be constants or may be adaptively controlled according to the features of an input speech signal. The weighting section 202 calculates $\gamma_1^i \times a_i$ and $\gamma_2^i \times a_i$.

$$W(z) = \frac{A(z/\gamma_1)}{A(z/\gamma_2)} = \frac{1 + \sum_{i=1}^{P} \gamma_1^i a_i z^{-i}}{1 + \sum_{i=1}^{P} \gamma_2^i a_i z^{-i}} \quad (9)$$

The target vector generation section 203 calculates a signal obtained by subtracting a zero-input response of the cascaded filter of the synthesis filter (constructed of a quantization linear predictive coefficient) and the perceptual weighting filter from the input speech signal filtered by the perceptual weighting filter in Expression (9) and outputs the subtraction result to the adaptive codebook search section 206, the fixed codebook search section 207 and the gain codebook search section 208. Although the target vector is obtained by subtracting a zero-input response from the input signal as described above, the target vector is generally generated in the following manner.

First, the input speech signal is filtered by an inverse filter A(z) to obtain a linear predictive residual. Next, this linear predictive residual is filtered by a synthesis filter 1/A'(z) made up of a set of quantization linear predictive coefficients. However, the filter status at this time is a signal obtained by subtracting a synthesized speech signal (generated by the local decoding section 212) from the input speech signal. In this way, an input speech signal after removing the zero-input response of the synthesis filter 1/A'(z) is obtained.

Next, this input speech signal after removing the zero-input response is filtered by the perceptual weighting filter W(z). However, the filter status (AR side) at this time is a signal obtained by subtracting the weighted synthesis speech signal from the weighted input speech signal. Here, this signal (signal obtained by subtracting the weighted synthesis speech signal from the weighted input speech signal) is equivalent to a signal obtained by subtracting the sum of the product of the adaptive codebook component (signal generated by filtering the adaptive code vector by the zero-state synthesis filter 1/A'(z) and perceptual weighting filter W(z)) by a quantized gain and the product of the fixed codebook component (signal generated by filtering the fixed code vector by the zero-state synthesis filter 1/A'(z) and perceptual weighting filter W(z)) by a quantized gain from the target vector, and therefore the signal is generally calculated in such a way (as written in Expression (10)). In Expression (10), x denotes a target vector, $g_a$ denotes an adaptive codebook gain, H denotes a weighting synthesis filter impulse response convolution matrix, y denotes an adaptive code vector, $g_f$ denotes a fixed codebook gain, z denotes a fixed code vector, respectively).

$$x-(g_aHy+g_fHz) \quad (10)$$

The LPC quantization section 204 carries out quantization and coding on the linear predictive coefficients (LPC) input from the linear predictive analysis section 201 and outputs the quantized LPC to the impulse response calculation section 205 and the local decoding section 212 and outputs the coding information to the multiplexing section 213. LPC is generally converted to LSP, etc., and then quantization and coding on the LSP is performed.

The impulse response calculation section 205 calculates an impulse response of a cascaded filter of the synthesis filter 1/A' (z) and the perceptual weighting filter W(z) and outputs the impulse response to the adaptive codebook search section 206, the fixed codebook search section 207 and the gain codebook search section 208.

The adaptive codebook search section 206 receives the impulse response of the perceptual weighted synthesis filter from the impulse response calculation section 205, the target vector from the target vector generation section 203, the search method selection information (or control information on weighting matrix W) from the channel condition monitoring section 215, respectively, carries out an adaptive codebook search using a specified search method (or weighting matrix W) and outputs an adaptive code vector to the local decoding section 212, an index corresponding to the pitch lag to the multiplexing section 213, and a signal with the impulse response (input from the impulse response calculation section 205) convoluted into the adaptive code vector to the fixed codebook search section 207, the gain codebook search section 208 and the adaptive codebook component synthesis section 209, respectively.

In an adaptive codebook search, the methods described above using FIG. 2 and FIG. 4 can be alternatively performed. Which methods should be used is decided using the information input from the channel condition monitoring section 215. (Otherwise the weighting matrix W in the method described above using FIG. 4 can be changed with information input from the transmission path situation monitoring section 215.) That is, when the condition of the transmission channel is good and no packet discarding, etc., is observed on the receiving side, an ordinary search method (FIG. 2) is used (or a search is performed considering the weighting matrix W as a zero-matrix in the search method in FIG. 4); otherwise (in such a case where packet discarding is observed on the receiving side at a discarding rate of, for example, 5% or more) the search method (FIG. 4) of the present invention is used (in this case, the diagonal elements of the weighting matrix W may also be adaptively changed so as to increase as the packet discarding rate increases).

The fixed codebook search section 207 receives the impulse response of the perceptual weighted synthesis filter from the impulse response calculation section 205, the target vector from the target vector generation section 203, a vector with a perceptual weighted synthesis filter impulse response convoluted into the adaptive code vector from the adaptive codebook search section 206, respectively, performs a fixed codebook search, outputs a fixed code vector to the local decoding section 212, a fixed codebook index to the multiplexing section 213, a signal with the impulse response (input from the impulse response calculation section 205) convoluted into the fixed code vector to the gain codebook search section 208 and the fixed codebook component synthesis section 210, respectively.

A fixed codebook search refers to finding a fixed code vector z which minimizes the energy (sum of squares) in Expression (3). It is a general practice to multiply the already determined adaptive code vector y by an optimum adaptive codebook gain (pitch gain) $g_a$ (or quantized adaptive codebook gain when gain quantization is carried out before the fixed codebook search), designate the signal with the impulse response convoluted (that is, $x-g_a Hy$) as a fixed codebook search target signal x' and determine a fixed code vector z which minimizes $|x'-g_2 Hz|^2$.

The gain codebook search section 208 receives the impulse response of the perceptual weighted synthesis filter from the impulse response calculation section 205, the target vector from the target vector generation section 203, a vector with the impulse response of the perceptual weighted synthesis filter convoluted into the adaptive code vector from the adaptive codebook search section 206, a vector with the impulse response of the perceptual weighted synthesis filter convoluted into the fixed code vector from the fixed codebook search section 207, respectively, carries out a gain codebook search, and outputs the quantized adaptive codebook gain to the adaptive codebook component synthesis section 209 and the local decoding section 212, the quantized fixed codebook gain to the fixed codebook component synthesis section 210 and the local decoding section 212, the gain codebook index to the multiplexing section 213, respectively. A gain codebook search refers to selecting a code for generating a quantized adaptive codebook gain ($g_a$) and quantized fixed codebook gain ($g_f$) which minimizes the energy (sum of squares) in Expression (3) from the gain codebook.

The adaptive codebook component synthesis section 209 receives the vector with the impulse response of the perceptual weighted synthesis filter convoluted into the adaptive code vector from the adaptive codebook search section 206 and the quantized adaptive codebook gain from the gain codebook search section 208, respectively, multiplies the one by the other and outputs the product as the adaptive codebook component of the perceptual weighting synthesized signal to the adder 211.

The fixed codebook component synthesis section 210 receives the vector with the impulse response of the perceptual weighted synthesis filter convoluted into the fixed code vector from the fixed codebook search section 207 and the quantized fixed codebook gain from the gain codebook search section 208, respectively, multiplies the one by the other and outputs the product as the fixed codebook component of the perceptual weighting synthesized signal to the adder 211.

The adder 211 receives the adaptive codebook component of the perceptual weighting synthesized speech signal from the adaptive codebook component synthesis section 209 and the fixed codebook component of the perceptual weighting synthesized speech signal from the fixed codebook component synthesis section 210, respectively, adds up the two and outputs the addition result as the perceptual weighted synthesized speech signal (zero-input response is removed) to the target vector generation section 203. The perceptual weighting synthesized speech signal input to the target vector generation section 203 is used to generate a filter state of the perceptual weighting filter when the next target vector is generated.

The local decoding section 212 receives the quantized linear predictive coefficients from the LPC quantization section 204, the adaptive code vector from the adaptive codebook search section 206, the fixed code vector from the fixed codebook search section 207, the quantized adaptive codebook gain and quantized fixed codebook gain from the gain codebook search section 208, respectively, drives the synthesis filter made up of the quantized linear predictive coefficients, generates a synthesized speech signal by exciting the synthesis filter using an excitation vector obtained by adding up the product of the adaptive code vector by the quantized adaptive codebook gain and the product of the fixed code vector by the quantized fixed codebook gain, and outputs the synthesized speech signal to the target vector generation section 203. The synthesized speech signal input to the target vector generation section 203 is used to generate a filter state for generating a synthesized speech signal after a zero-input response is removed when the next target vector is generated.

The multiplexing section 213 receives the coding information of the quantized LPC from the LPC quantization section 204, the adaptive codebook index (pitch lag code) from the adaptive codebook search section 206, the fixed codebook index from the fixed codebook search section 207, the gain codebook index from the gain codebook search section 208, respectively, multiplexes them into one bit stream and outputs the bit stream to the packetizing section 214.

The packetizing section 214 receives the coding bit stream from the multiplexing section 213, packs the coding bit stream in a payload packet and outputs the payload packet to a packet transmission channel.

The channel condition monitoring section 215 monitors the condition of the transmission channel (e.g., monitors the channel condition at the receiving side using a protocol such as RTCP) and outputs control information for switching the method of adaptive codebook search when packet loss frequently occurs in the transmission channel or else (otherwise change the weighting matrix W according to the packet loss rate) to the adaptive codebook search section 206.

The subjective quality of speech communication through a poor transmission channel is improved by providing such a transmission channel condition monitoring section 215 and adaptively changing the adaptive codebook search method.

Figure 6:
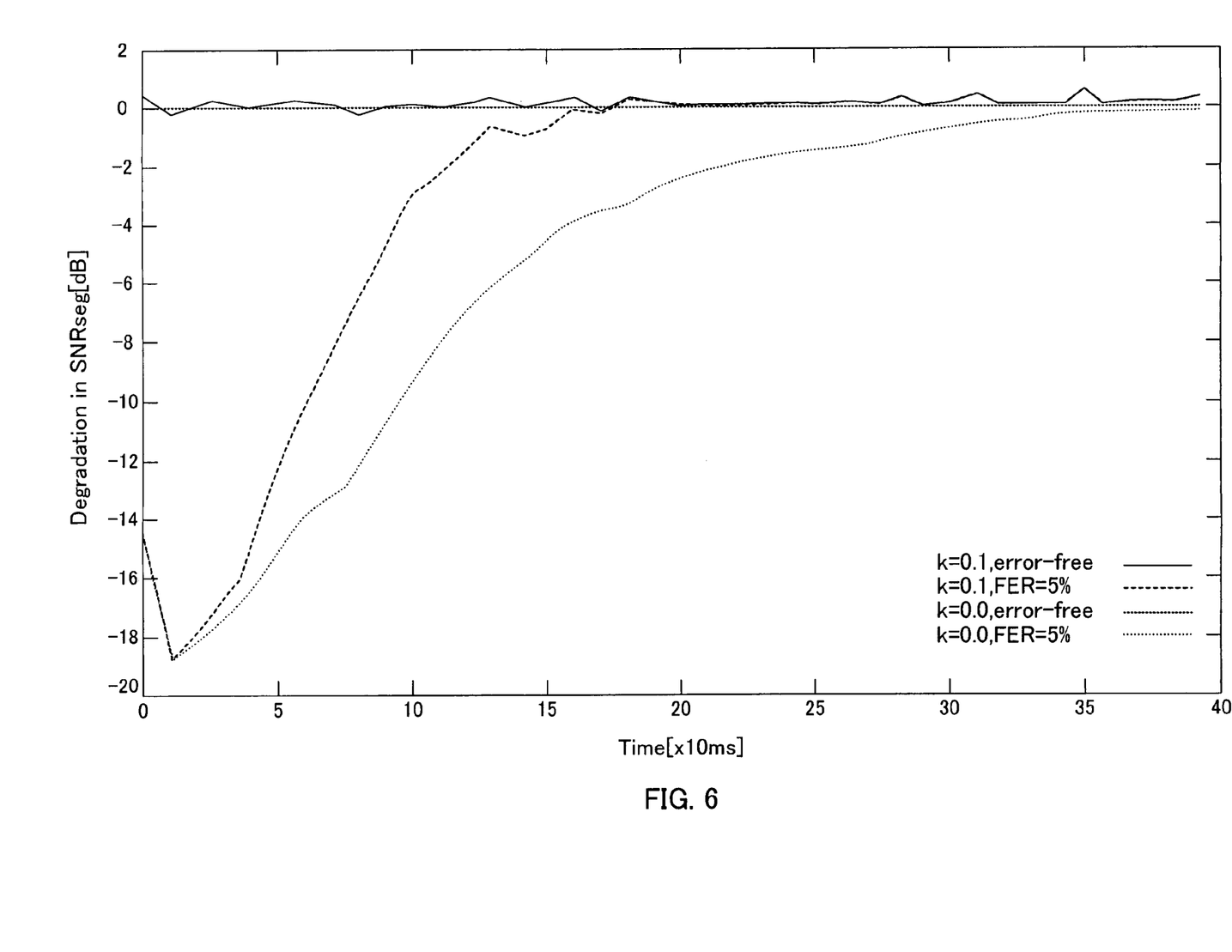
FIG. 6 is a graph showing an error propagation suppression effect when the excitation codebook search method according to this embodiment is used.

FIG. 6 shows objective performance with a segmental SNR (SNRseg) when a 3GPP standard AMR scheme (12.2 kbit/s) is used as a speech coding scheme and $w_0 = w_1 = \ldots = w_{L-1} = k = 0.1$ is used as a weighting matrix. This is the result of an experiment when frame losses are generated periodically once every 20 frames (frame loss rate (FER) is 5%).

The horizontal axis shows a time from a lost frame (the start of lost frame is assumed to be 0) and the vertical axis shows an average value of "{SNRseg with FER 5%}−{SNRseg with error free (no error)}." That is, the graph shows that degradation increases toward lower parts on the vertical axis and scale 0 on the vertical axis indicates the same performance as "error free" in the AMR scheme.

As is evident from this FIG. 6, when k=0.0 (that is, equivalent to the case where no search according to the present invention is performed), degradation of SNRseg due to an error (frame loss) propagates up to nearly 400 ms (20 frames including lost frame) after a frame loss occurs, while when k=0.1, the propagation continues only up to approximately 150 ms (7 to 8 frames including lost frame) after a frame loss occurs. That is, it is possible to achieve the effect of suppressing the propagation of degradation of SNRseg due to errors to half or less.

Figure 7:
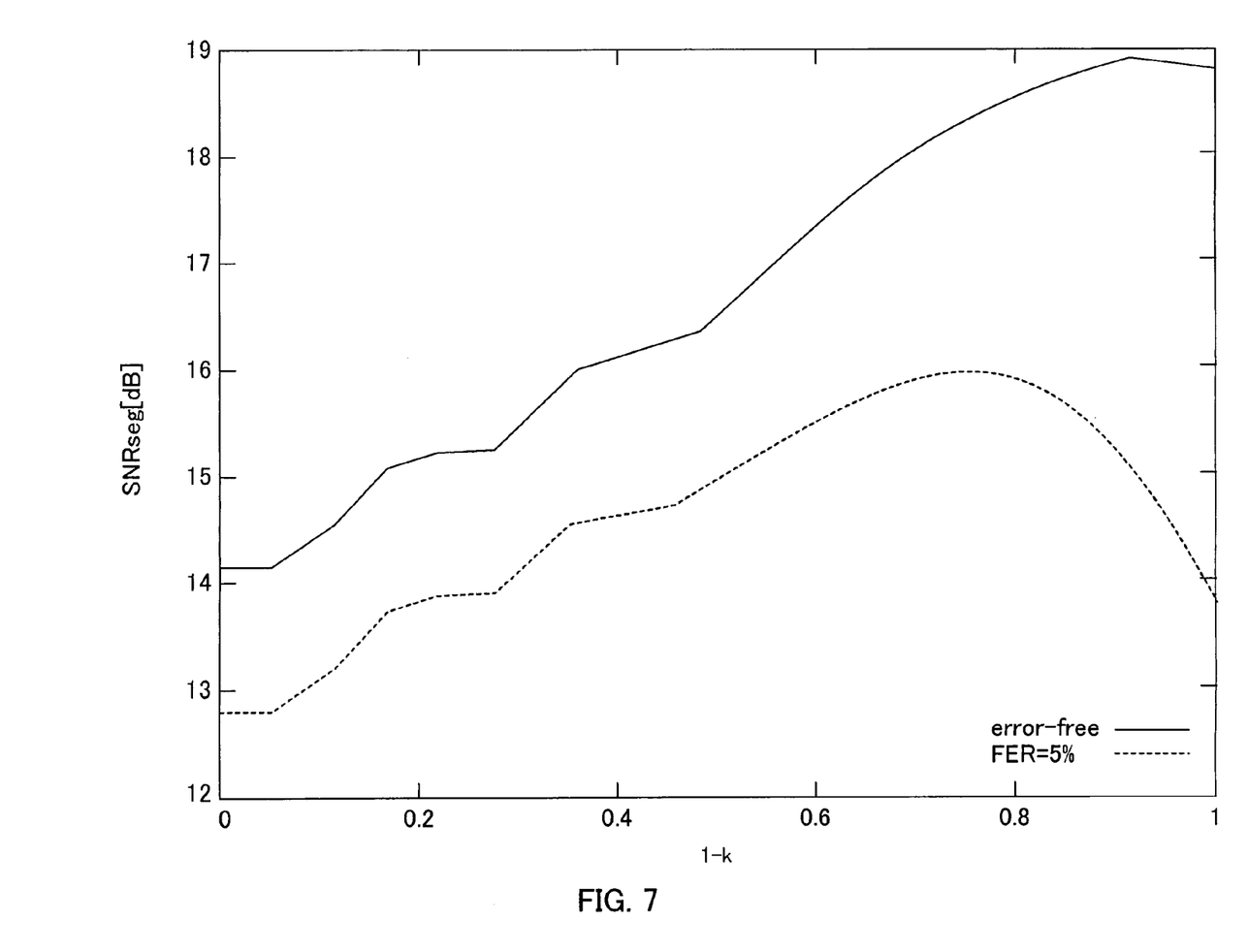
FIG. 7 is a graph showing an error propagation suppression effect when the excitation codebook search method of this embodiment is used.

FIG. 7 shows the result of another similar experiment (using an AMR scheme (12.2 kbit/s), using $w_0 = w_1 = \ldots = w_{L-1} = k$ as a weighting matrix and periodically generating frame losses once every 20 frames). This experiment result shows a comparison of the average SNRseg performance when the value of k is changed. In the figure, the solid line represents the average SNRseg performance when there is no frame loss and the value of k is changed within a range of 0 to 1, and the dotted line represents the average SNRseg performance in the FER 5% condition and the value of k is changed within a range of 0 to 1. The horizontal axis represents (1−k).

As is evident from this FIG. 7, if k is approximately 0.1, the SNRseg performance can be improved by approximately 2 dB in the case of a frame loss without degradation of the SNRseg performance with no error. Furthermore, when k is up to approximately 0.2, the SNRseg performance in the case of a frame loss can be further improved while the degradation of the SNRseg performance with no error is little. That is, it is possible to achieve the effect of improving the SNRseg performance by approximately 2 dB under the frame loss condition without degradation of the basic performance in the error free condition.

Figure 4:
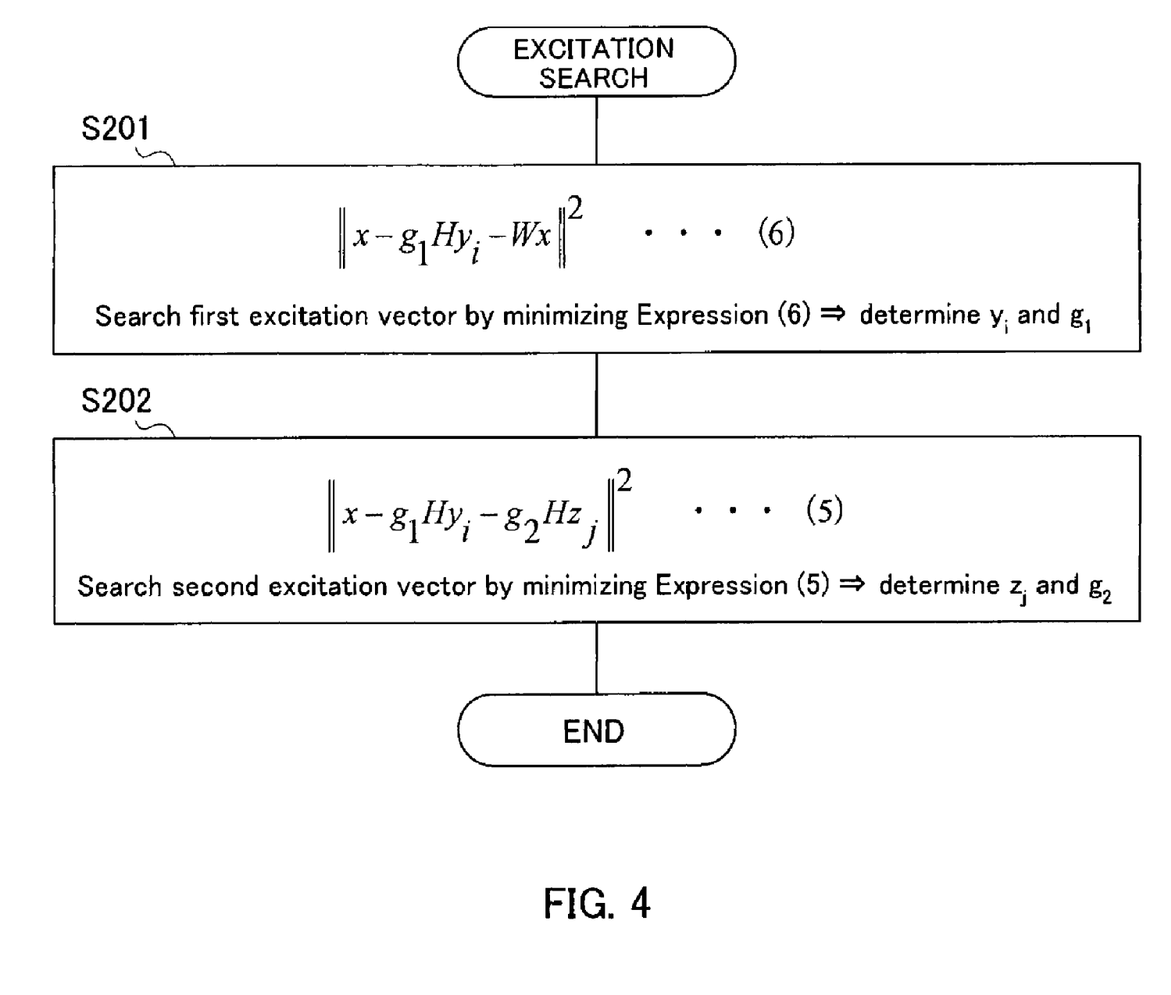
FIG. 4 is a flow chart showing an excitation codebook search method according to this embodiment.

The portion whose subjective quality is improved most by the error propagation suppression effect by the adaptive codebook search according to the present invention as shown in FIG. 4 is the onset part of speech, and therefore the configuration including a separate functional block for detecting the onset and using the search method explained using FIG. 4 only at the onset (or changing the elements of the weighting matrix W between the onset and other part) is also effective.

The explanations above have assumed the transmitting side as the base station and the receiving side as the mobile station apparatus, but it is also possible to assume the transmitting side as the mobile station apparatus and the receiving side as the base station. That is, it is also possible to adopt a configuration in which the mobile station apparatus includes a speech coding apparatus and the base station includes a speech decoding apparatus.

As explained so far, according to the present invention, it is possible to improve communication quality under conditions with transmission path errors by changing the adaptive codebook search method. That is, even when errors are included in the first excitation vector, the features of correct signals can be decoded using the second excitation vector and error resilience can be improved.

Furthermore, when the second target vector is a vector obtained by multiplying the first target vector by a weighting matrix having values only in diagonal elements, the values ranging from 0 to 1, it is possible to enhance an arbitrary element of the first target vector and arbitrarily select the features of the first target vector to be left for the second target vector.

Furthermore, when all the diagonal elements of the above described weighting matrix have the same value, the first target vector and second target vector can be set to have a completely similar relationship (only the vector amplitude is scaled and the vector shapes are the same) and leave the same features of the first target vector for the second target vector.

Furthermore, when the congestion situation or error situation of a transmission channel is monitored and the values of diagonal elements of the weighting matrix are changed according to the monitoring results, it is possible to control the degree of the features of the first target vector to be left for the second target vector according to the situation of occurrence of transmission channel errors, and thereby adaptively change the tradeoff between the coding performance and error resilience.

The present invention is not limited to the above described embodiments, and various variations and modifications may be possible without departing from the scope of the present invention.

This application is based on the Japanese Patent Application No. 2003-325002 filed on Sep. 17, 2003, entire content of which is expressly incorporated by reference herein.

[FIG. 1]
1 ADAPTIVE CODEBOOK
4 FIXED CODEBOOK
QUANTIZATION LINEAR PREDICTIVE COEFFICIENT
$a_p$

6 SYNTHESIS FILTER
SYNTHESIZED SPEECH SIGNAL s
INPUT SPEECH SIGNAL
8 WEIGHTING FILTER

[FIG. 2]
EXCITATION SEARCH
S101 Search first excitation vector by minimizing Expression
(2)→determine $y_i$ and $g_1$
S102 Search second excitation vector by minimizing Expression
(5)→determine $z_j$ and $g_2$

[FIG. 3]
101 INPUT APPARATUS
102 A/D CONVERSION APPARATUS
103 SPEECH CODING APPARATUS
104 SIGNAL PROCESSING APPARATUS
105 RF MODULATION APPARATUS
106 TRANSMISSION APPARATUS
112 RECEPTION APPARATUS
113 RF DEMODULATION APPARATUS
114 SIGNAL PROCESSING APPARATUS
115 SPEECH DECODING APPARATUS
116 D/A CONVERSION APPARATUS
117 OUTPUT APPARATUS

[FIG. 4]
EXCITATION SEARCH
S201 Search first excitation vector by minimizing Expression
(6)→determine $y_i$ and $g_1$
S202 Search second excitation vector by minimizing Expression
(5)→determine $z_j$ and $g_2$

[FIG. 5]
201 LINEAR PREDICTIVE ANALYSIS SECTION
202 WEIGHTING SECTION
203 TARGET VECTOR GENERATION SECTION
204 LPC QUANTIZATION SECTION
205 IMPULSE RESPONSE CALCULATION SECTION
206 ADAPTIVE CODEBOOK SEARCH SECTION
207 FIXED CODEBOOK SEARCH SECTION
208 GAIN CODEBOOK SEARCH SECTION
210 FIXED CODEBOOK COMPONENT SYNTHESIS SECTION
212 LOCAL DECODING SECTION
213 MULTIPLEXING SECTION
214 PACKETIZING SECTION
OUTPUT PACKET
209 ADAPTIVE CODEBOOK COMPONENT SYNTHESIS SECTION
CHANNNEL INFORMATION
215 CHANNEL CONDITION MONITORING SECTION

What is claimed is:

1. An excitation signal coding apparatus for increasing the correlation between a synthesized speech signal and an input speech signal, the apparatus comprising:
a first excitation codebook section that:
generates for each of a plurality of prospective first excitation vectors a corresponding first synthesized vector,
subtracts each of the generated first synthesized vectors from a first target vector, representing the input speech signal, to produce a residual vector,
multiplies the first target vector by predetermined coefficients to produce a second target vector,
identifies which of the prospective first excitation vectors corresponds to the residual vector having the minimal difference with the second target vector, and
identifies the residual vector having the minimal difference with the second target vector;
a second excitation codebook section that:
generates for each of a plurality of prospective second excitation vectors a corresponding second synthesized vector, and
identifies which of the prospective second excitation vectors corresponds to the generated second synthesized vector having the minimal difference with an identified residual error; and
a summer that sums the identified first and second excitation vectors to produce an excitation signal; and
a generator that generates the synthesized speech signal with the excitation signal.

2. The excitation signal coding apparatus according to claim 1, wherein said second target vector is a vector obtained by multiplying said first target vector by a weighting matrix having values only in the diagonal elements, said values ranging from 0 to 1.

3. The excitation signal coding apparatus according to claim 2, wherein all diagonal elements of said weighting matrix have the same value.

4. The excitation signal coding apparatus according to claim 2, further comprising:
a monitor that monitors transmission channel conditions, including a degree of traffic congestion or error occurrence; and
a switch that changes values of diagonal elements of said weighting matrix according to the channel condition monitored by said monitor.

5. A mobile station apparatus comprising the excitation signal coding apparatus according to claim 1.

6. A base station apparatus comprising the excitation signal coding apparatus according to claim 1.

7. An excitation signal coding method for increasing the correlation between a synthesized speech signal and an input speech signal, the method comprising:
generating for each of a plurality of prospective first excitation vectors a corresponding first synthesized vector;
subtracting each of the generated first synthesized vectors from a first target vector, representing the input speech signal, to produce a residual vector;
multiplying the first target vector by predetermined coefficients to produce a second target vector;
identifying which of the prospective first excitation vectors corresponds to the residual vector having the minimal difference with the second target vector;
identifying the residual vector having the minimal difference with the second target vector;
generating for each of a plurality of prospective second excitation vectors a corresponding second synthesized vector;
identifying which of the prospective second excitation vectors corresponds to the generated second synthesized vector having the minimal difference with an identified residual error;
summing the identified first and second excitation vectors to produce an excitation signal; and
generating the synthesized speech signal with the excitation signal.

* * * * *